Dec. 17, 1929. C. H. FENNELL 1,740,167
TESTING STAND
Filed July 15, 1926
Fig. 1.
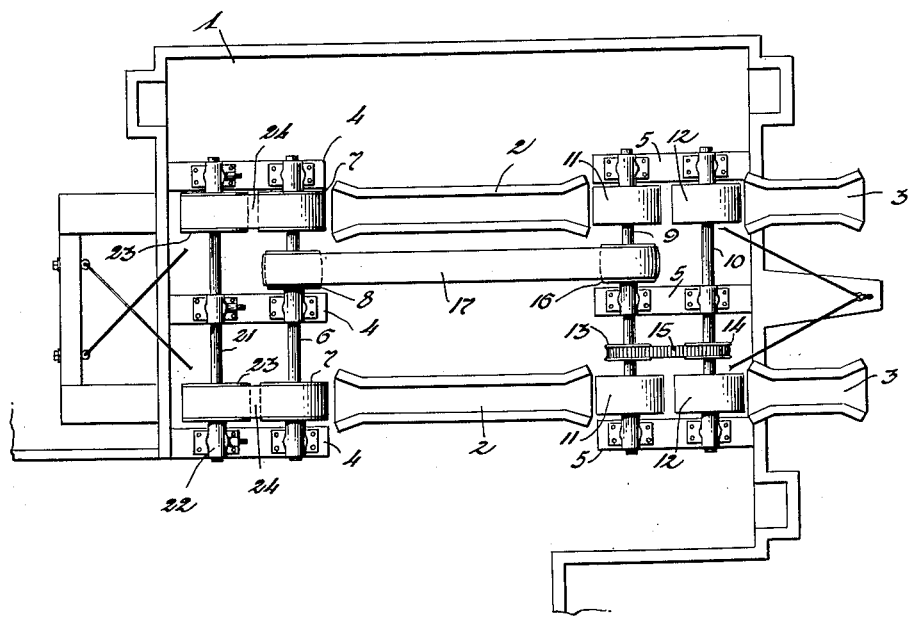
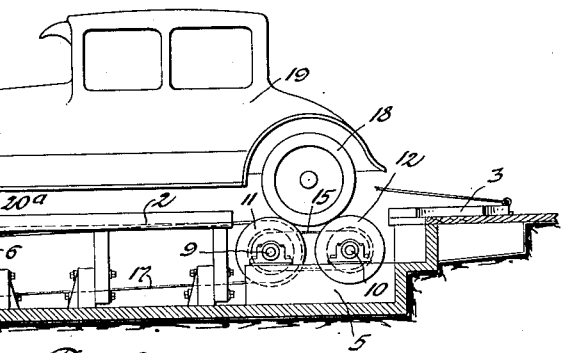
Fig. 2.
Inventor:
Charles H. Fennell
By
Attorneys Patented Dec. 17, 1929

1,740,167

UNITED STATES PATENT OFFICE

CHARLES H. FENNELL, OF DETROIT, MICHIGAN

TESTING STAND

Application filed July 15, 1926. Serial No. 122,544.

This invention relates to automobile testing and adjustment tracks such as of the type described in Patent No. 1,548,193 granted to me on August 4, 1925, and has for its object to provide an improvement therein, whereby provision is made for the accommodation of vehicles having varying wheel bases.

In the said former patent the device is indicated as including pairs of rollers which receive and support the rear wheels of an aumobile therebetween, and further rollers positioned to support the front wheels thereof, and the present invention contemplates the adding to the said front wheel rollers of short endless belt tracks offering a more extended surface than do the simple rollers, so that the front wheels of cars having differing wheel bases may rest at various points along said endless belt tracks without altering the relationship of the rear wheels to the rear rollers, between which and the front endless track arrangement a transmission is provided to ensure synchronous operation of the front and rear wheels of the vehicle.

Further objects subsidiary to or resulting from the aforesaid objects, or from the construction or operation of the invention as it may be carried into effect, will become apparent as the said invention is hereinafter further disclosed.

In carrying the said invention into effect, I may provide the novel construction and arrangement of parts hereinafter described, by way of example, having reference to the accompanying drawing, wherein—

Figure 1 is a plan view of an apparatus constructed in accordance with this invention; and Figure 2 is an elevation of the same showing an automobile in position thereon.

Similar characters of reference indicate similar parts in both figures of the drawing.

The arrangement resembles that disclosed in my said Patent No. 1,548,193 in that it includes a pit 1 having runways 2 therein, approaches 3 and pedestals 4 and 5, the first of which pedestals has suitably mounted thereon a shaft 6 carrying rollers 7 and a pulley 8. 9 and 10 are shafts suitably mounted on the pedestal 5 carrying rollers 11 and 12 and gear wheels 13 and 14 connected by the chain 15.

A pulley 16 in the shaft 9 cooperates with the pulley 8 of the shaft 6 in carrying a transmission belt 17 in such a manner that motion transmitted to the rollers 11 and 12 by the rear wheels 18 of an automobile 19 which may be mounted on the said device, will be transmitted through the belt 17 to the pulleys 7 and to the front wheels 20 of the said automobile. Thus far the arrangement described is that of my patent above referred to, which sets forth the advantages of such a device so that they do not require further explanation herein, but it will be seen that in the present arrangement a further shaft 21 is shown as being mounted on the pedestal 4 by means of adjustable pillow blocks 22, this shaft 21 carrying rollers 23 arranged in advance of the rollers 7 and similar thereto, the said rollers 7 and 23 being adapted as by annular grooving to carry endless belt tracks 24. The object of the adjustable pulley blocks 22 is to enable these belt tracks to be maintained at a desired tension.

In Figure 2, 20$^a$ and 20$^b$ indicate in dotted lines the position of the front wheels of an automobile having respectively a shorter and a longer wheel base than that shown in full lines, and it will be seen that irrespective of such change in the length of the wheel base, the same driving relation exists between the front and rear wheels of the vehicle, so that their operation is synchronized in the desired manner.

This arrangement permits the utilizing of the device with different models of automobiles without previous preparation, alteration or adjustment of the device, so that the testing and running in of a variety of models may be effected one after the other without delay and without requiring additional equipment.

This invention may be developed within the scope of the following claims without departing from the essential features of the said invention, and it is desired that the specification and drawing be read as merely illustrative and not in a limiting sense, except as necessitated by the prior art.

What I claim is:—

1. A testing stand for motor vehicles comprising rollers adapted to support and to be driven by the rear wheels of an automobile, pairs of aligned rollers journaled in advance of the first named rollers, belts passed around said aligned rollers and adapted to support the front wheels of an automobile, and means for driving the aligned rollers from said first named rollers.

2. A testing stand for motor vehicles comprising forward and rear pairs of aligned rollers, the rear pairs being adapted to support and to be driven by the rear wheels of an automobile, and belts passed around said forward aligned rollers and adapted to support the front wheels of an automobile.

3. A testing stand for motor vehicles comprising forward and rear pairs of aligned rollers, the rear pairs being adapted to support and to be driven by the rear wheels of an automobile, belts passed around said forward aligned rollers and adapted to support the front wheels of an automobile, and means for driving the forward rollers from the rear rollers.

4. A testing stand for motor vehicles comprising rollers adapted to support and to be driven by the rear wheels of an automobile, a pair of shafts journaled in spaced relation in advance of said rollers, pairs of aligned rollers carried by said shafts, belts passed around said aligned rollers and adapted to support the front wheels of said automobile, and an operative connection between one of said shafts and said first named rollers for driving the rollers.

In testimony whereof I affix my signature.

CHARLES H. FENNELL.